(No Model.)
J. LEEDE.
CARBURETOR.
No. 370,149. Patented Sept. 20, 1887.
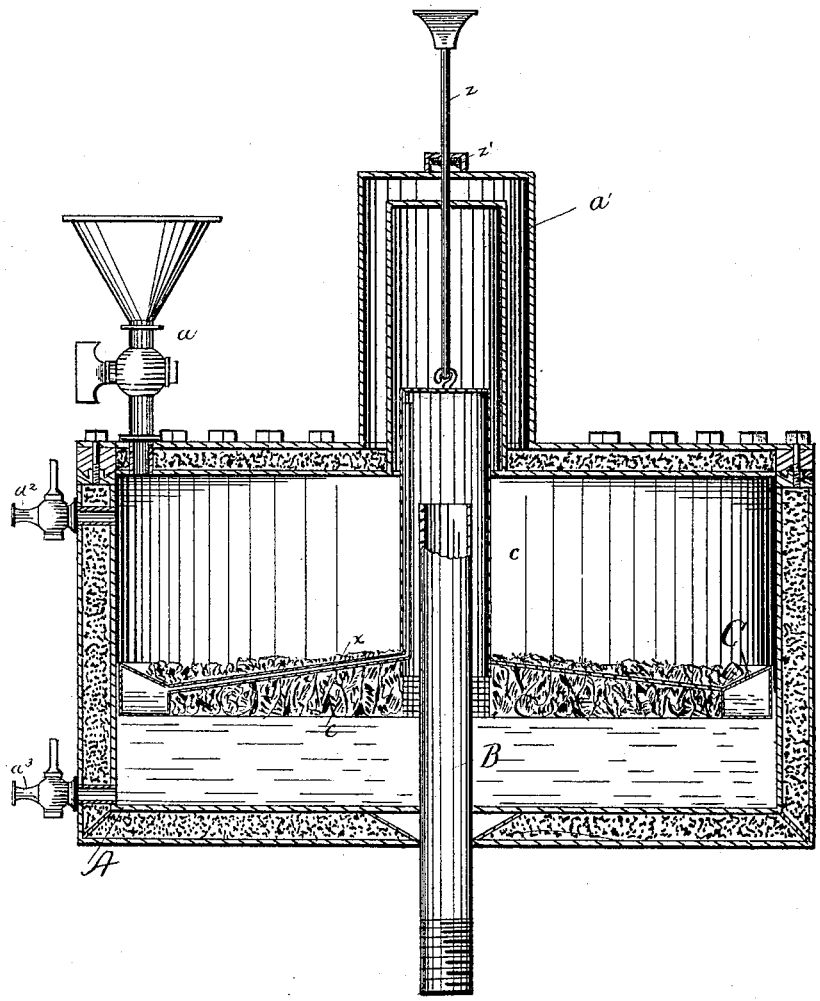
Witnesses:
Wm. M. Stockbridge.
A. C. Rawlings
Inventor.
Julius Leede.
by V. D. Stockbridge,
Atty.

UNITED STATES PATENT OFFICE.

JULIUS LEEDE, OF WASHINGTON, DISTRICT OF COLUMBIA.

CARBURETOR.

SPECIFICATION forming part of Letters Patent No. 370,149, dated September 20, 1887.

Application filed February 19, 1887. Serial No. 228,219. (No model.)

*To all whom it may concern:*

Be it known that I, JULIUS LEEDE, a citizen of the United States, residing at Washington, in the District of Columbia, have invented certain new and useful Improvements in Carburetors; and I do hereby declare the following to be a full, clear, and exact description of the invention, such as will enable others skilled in the art to which it appertains to make and use the same.

My invention relates to apparatus for carbureting air to be used for illuminating purposes, and has for its object an efficient and economical automatic apparatus for charging air with the vapors of volatile hydrocarbons, and more particularly the light products of petroleum, so as to furnish a cheap and brilliant light.

Carbureting apparatus hitherto used, so far as known to me, consist of two general classes, in one of which the air is forced through a reservoir freely over the surface of hydrocarbon contained in chambers and cells, or forced between the liquid and a cover or disk supported upon and near the surface of the liquid, or through a chamber in which the liquid is held in suspension by absorbent material. In the other class of cases, which may be termed "gravity" carburetors, the air has been drawn freely through a chamber containing hydrocarbon or through the liquid in suspension. In this class of cases the mouth of the eduction-pipe has been fixed, while the volume of the hydrocarbon is constantly changing, thus making a variable passage through the chamber.

My invention is an improvement in the second class of carburetors, and is based upon the fact that air and hydrocarbon vapors are together of greater specific gravity than air alone, and will therefore flow by gravity through pipes to burners located below the carbureting chamber or reservoir. The object of the invention is to utilize or to take advantage of the superior gravity of the mixture, whereby means for forcing a current of air through the carbureting-chamber may be dispensed with and very simple and efficient apparatus may be produced, while a uniform density of vapor is supplied for consumption.

To this end the preferred form of my invention consists in a reservoir of any suitable shape, having an inlet-pipe leading into the upper part of the chamber thereof, through which the vessel may be charged with gasoline and for the admission of air when in use, and having an outlet-pipe extending from the upper part of the chamber downward through the bottom to connect with and form a part of the service-pipes for the structure to be lighted, in combination with an interior float to ride on the surface of the contents of the vessel, said float carrying a hood inclosing the central outlet-pipe. The hood constitutes the short leg of a siphon and the outlet and service pipes the long leg, whereby when in use the superior gravity of carbureted air will siphon the densest part of the vapor from that part of the chamber in close proximity to the surface of the liquid upward through the hood and through the downwardly-leading eduction-pipe to induce a current of air into the chamber or vessel.

In the drawing, the figure is a central vertical section showing the relation of the parts of my improved carburetor incased in a suitable jacket.

A is the vessel or reservoir proper for holding the hydrocarbon. It is provided with a cover having a central dome, $a'$. The upper edge of the vessel is flanged, and the cover is tightly secured in place by rivets or solder or by bolts, according to whether the cover is removable or not. Ordinarily the apparatus need not be opened after it has been prepared for use. The main vessel, by preference, is surrounded or jacketed with non-conducting material for the purpose of protecting the contents of the apparatus from rapid variations of temperature. The dome $a'$ of the reservoir is likewise protected by a cover, which passes down over the same, as shown, leaving an air-space between the dome of the vessel and the said cover.

As shown in the drawing, the space between the external wall and that next to it is filled with plaster-of-paris or other solid non-conducting material. The jacket is properly secured by studs or braces between it and the vessel, so as to make the whole structure strong and rigid.

By applying a non-conducting jacket to the apparatus the same will be protected for a considerable time from the heat arising in case of a conflagration, and no danger can therefore arise from such source.

A central pipe, B, open at the top, passes up through the bottom of the vessel, the lower end thereof being screw-threaded for connection with the service-pipes leading to points below the apparatus. Hydrocarbon is introduced to the vessel through feed-tube $a$, which is provided with a funnel-mouth, as shown, and enters the vessel at a point above the highest level of the liquid. This tube is provided with a cock to close the tank and prevent the escape of vapor when the apparatus is not in operation. Wire-gauze is arranged across the end of this tube, as well as all other openings leading directly to and from the tank, to prevent the entrance of flame from without. The vessel is tapped near the top and bottom, and petcocks $a^2$ and $a^3$ are inserted therein, the former to avoid overcharging the tank and the latter to draw off the contents for transportation, cleansing, and the like.

C is a float, consisting of an annular drum, to encircle the central pipe, B. This float, as shown, carries a cap or hood, $c$, which embraces the top of the pipe B, the space between the two constituting the short leg of the siphon. The hood moves up and down with the float in the dome $a'$, heretofore described. Instead of the embracing-hood $c$, as shown, a goose-neck fitted to telescope with the pipe may be used. The float sustains a sponge or other absorbent material, $e$, which fills the space around the lower end of the hood $c$ and the central opening of the float. The float sinks deep enough in the liquid to submerge a portion of the absorbent material and to keep it constantly saturated. Instead of the sponge or other absorbent carried on the float, or in addition thereto, an annular wall of absorbent material may be adjusted against the inner vertical walls of the reservoir. A convenient device for holding the annular absorbent in position is a cylinder of wire-gauze of the proper diameter.

In using my improved carburetor, the tank being filled, I arrange the same in the upper part or on top of the building to be lighted, or in any position above the burners, open the cock in the funnel $a$, and as the hydrocarbon vapor is heavier than air it descends through the tube or pipe B to the burners, siphoning or drawing atmospheric air into the vessel and into and through the absorbent material at the surface of the liquid.

In practice it is best to have separate service-pipes leading from the upper part of the reservoir within the hood to each floor of the structure to be lighted, so that the draft or current to the lower floor will not affect the pressure on the floors above.

As the evaporation during the carbureting operation largely reduces the temperature within the reservoir, I provide means to prevent the danger of collapse of the drum. I therefore provide a vent-pipe, $x$, which leads from the chamber within the drum to a point above the surface of the liquid, and by preference within the hood $a'$, as shown.

As a means of indicating the amount of the contents of the reservoir, I connect with the top of the hood $c$ a rod, $z$, as shown. A stuffing-box, $z'$, may be used to prevent the escape of vapors, if desired.

I claim as my invention—

1. A gravity carburetor consisting of the combination of a tank or reservoir, an inlet pipe or passage leading into the upper part of the tank, through which said tank is supplied with oil and air is admitted, an outlet-pipe leading downward from the upper part of the tank, forming the upper end of the service-pipe and constituting the long leg of a siphon, a float to ride upon the liquid, and a hood mounted on said float for inclosing the upper end of the outlet or service pipe, and forming the short leg of a siphon, whereby a siphonic action from the tank is obtained and the exhaustion from the tank by said action is automatically supplied with fresh air and a draft-current through the carburetor close to the surface of the liquid is maintained, substantially as described.

2. In a gravity carburetor, the combination of a tank or reservoir having an air-inlet through its top, an outlet-pipe leading downward from the upper part of said tank, forming the upper section of the main service-pipe and constituting the long leg of a siphon, a float and a tubular hood mounted on said float embracing the upper end of the outlet-pipe, and forming the short leg of a siphon for drawing carbureted air from the vessel to said service-pipe, and inducing a current through said vessel, as specified.

3. The combination, with the drum or float for carbureting apparatus, of a vent opening or tube, as and for the purpose described.

In testimony whereof I affix my signature in presence of two witnesses.

JULIUS LEEDE.

Witnesses:
WARREN C. STONE,
WM. M. STOCKBRIDGE.